Patented Aug. 31, 1954

2,687,947

UNITED STATES PATENT OFFICE 2,687,947

PRODUCTION OF SULFUR DIOXIDE

John Manning and William Hector Maclennan, Norton-on-Tees, England, assignors to Imperial Chemical Industries Limited, a corporation of Great Britain No Drawing. Application March 21, 1951, Serial No. 216,844

Claims priority, application Great Britain April 4, 1950

6 Claims. (Cl. 23—177)

This invention relates to the production of sulphur dioxide and more particularly to the production of sulphur dioxide for use in the manufacture of sulphuric acid by known processes.

It is already known to use naturally occurring calcium sulphate as a source of lime in the manufacture of cement, the calcium sulphate material being heated with coal and ash in rotary kilns of the type usually employed in the art. The flue gases leaving the kilns contain sulphur dioxide from the decomposition of the calcium sulphate but this is accompanied by large volumes of other gases chiefly the products of combustion of the fuel and any excess air used.

In contradistinction to these the present invention provides a process for the continuous production of sulphur dioxide from naturally occurring calcium sulphate in considerably higher concentration than that obtained by known processes and therefore particularly advantageous for use in processes for the production of sulphuric acid.

According to the present invention there is provided a process for the continuous production of sulphur dioxide which comprises charging to a continuous tunnel kiln a mixture containing calcium sulphate carbonaceous material and silica whereby the mixture is subjected to indirect heating, in the absence of added oxygen, to a temperature within the range of 900° C. to 1400° C. to decompose the calcium sulphate and to give a gaseous mixture containing sulphur dioxide.

Continuous tunnel kilns suitable for use in the process of the present invention are those of the type known in the ceramic arts as muffled tunnel kilns in which there is no direct contact of the gases used for heating with the goods being heated. Tunnel kilns heated electrically by resistance or induction may also be used. Such tunnel kilns may be straight or circular in plan. Furthermore the temperature at any given point within the kiln is substantially constant and may be readily controlled throughout its length, so that the charge may be brought up to temperature, held at the required temperature and cooled during such periods as may be desired by the adjustment of the rate of progress of the cars or trucks on which the charge is passed through the kiln.

The calcium sulphate used in the process of the present invention may be in any desired form, for example gypsum, but it is preferred to use substantially anhydrous calcium sulphate, for example natural anhydrite or calcined gypsum.

The carbonaceous material may be any such material which does not give rise to objectionable products on heating to the temperature involved in the process, for example, coal, coke or bitumen, but it is preferred to use coke breeze.

In general, the mixture charged to the process will contain calcium sulphate and carbonaceous material in proportions to satisfy the equation:

$$2CaSO_4 + C \rightarrow 2CaO + 2SO_2 + CO_2$$

but the quantity of carbon may be varied and may be as high as one mole per mole of calcium sulphate.

Materials other than calcium sulphate, carbon and silica may be present in the mixture, and in particular those which will assist or take part in the reaction, for example acidic oxides such as alumina or substances which will give rise to such oxides having acidic properties under the reaction conditions.

It has been found that it is desirable for any such material to contain a high proportion of the required silica and that such material is more reactive when it is finely sub-divided. For example, finely ground sand and finely ground loam give good results. It has also been found that materials which will give rise to silica and other oxides in a reactive form under the reaction conditions, for example clays, give beneficial results. It is preferred to use a clay having a high proportion of silica, for example a common clay of the type used in the manufacture of cement and building bricks which, in general, contain silica and alumina in a ratio of about 2:1 by weight.

A preferred mixture of materials is anhydrite, coke breeze and silica or clay in which the amount of coke breeze may be sufficient to give up to 1 mole of carbon per mole of calcium sulphate and the amount of silica or clay is such that the moles of silica or the sum of the moles of silica and of alumina therein is up to two per mole of calcium sulphate. It has however been found that the best results are obtained when using a mixture comprising calcium sulphate, coke breeze and clay in such amounts as to give molar proportions of $CaSO_4:C:SiO_2+Al_2O_3$ of about 1:0.6:0.5.

In order to obtain intimate contact between the components of the mixture charged to the process it is desirable for them to be ground to pass British Standard Fine Sieve No. 52 (295μ) and preferably to pass British Standard Fine Sieve No. 100 (152μ), and to be thoroughly mixed together by any suitable means before being charged to the process.

The components and/or the mixture may be dried if desired at any stage of their preparation.

In operating the process of the present invention the mixture may be employed in the form of powder which is placed in suitable containers on the kiln cars or trucks. It has been found preferable however to form the mixture into pieces of suitable size and shape, for example by granulating or by molding. If desired moulded pieces may be of such sizes that they may be stacked directly on the kiln cars or trucks and containers dispensed with. The granulation or moulding may be done in known manner with the aid of a liquid bonding agent, for example water or an aqueous emulsion of bitumen.

It has been found that the granulation or moulding of the mixture to be charged to the process greatly reduces the formation of dust and consequently assists the production of substantially clean gas. Granulation or moulding reduces the tendency of the mixture to form fused masses under the reaction conditions and assists the free passage of the evolved gases. The tendency to the formation of fused masses may be still further reduced by coating the granules or moulded pieces with material which is refractory at the temperatures employed in the process, for example, powdered limestone or chalk. If granulation is employed for the preparation of the mixture, this may be done by any known means, for example in a paddle or drum granulator, and if it is desired to coat the granules with refractory material, this material may be added, in powdered form, during the final stage of the granulation. If it is desired to use moulded pieces, for example briquettes, and to coat these with refractory material, this refractory material may be applied to the moulds, for example as a slurry, before these are filled. If the granulation or moulding is done with the aid of water or water-containing bonding medium, the finished granules or moulded pieces may be dried before being fed to the process.

Although the process of the present invention may be operated with the temperature of the mixture within the range of 900° C. to 1400° C. it has been found preferable for the temperature to which the mixture is heated to be within the range of 1000° C. to 1250° C.

It will be understood that the above-mentioned temperatures are those of the mixture of reactants being treated and that the temperatures in the heating flues of the tunnel kiln will, in general, be higher.

In operating the process of the present invention the rate of passing the mixture of reactants through the kiln will of course depend on various factors, for example the dimensions of the kiln and the time of heating required to ensure substantially complete reaction of the components. It has been found that when using the preferred mixture of anhydrite, coke breeze and clay in the form of granules of about ⅛" diameter, satisfactory results may be obtained if the rate of charging and the heat input to the kiln are such that the mixture is heated to 1000° C. during a period of up to 1½ hours and to between 1000° C. and 1150° C. for a period of up to 2½ hours.

The reaction may if desired also be assisted by providing for the admission of nitrogen or other inert gas, or preferably steam, as this may easily be condensed from the gaseous products. Furthermore the necessary steam may conveniently be generated by waste heat from the process, and any sulphur dioxide dissolved in the condensate may be readily stripped therefrom.

It will be understood that the product gases which arise from the decomposition of the calcium sulphate will pass into the space above the kiln cars or trucks and provision will be made to draw off these product gases as desired.

Some free sulphur is formed in the process of the present invention, in an amount which may be as high as 17% of the total sulphur evolved from the calcium sulphate charged to the process. Substantially all this free sulphur will leave the process with the gaseous products and it may be separated therefrom by known methods, for example in solid or liquid form, or it may be burnt directly by known methods and preferably with a controlled amount of added oxygen or air. Burning the free sulphur with added air will, of course, have the disadvantage of reducing somewhat the proportion of sulphur dioxide in the product gases.

Free sulphur which has been separated from the gaseous products may, of course, be burnt with oxygen or air by known methods and the resulting gas containing sulphur dioxide may be added to the gaseous products leaving the process in such quantities as desired to adjust the sulphur dioxide content of these to a predetermined value.

The concentration of sulphur dioxide in the product gases of the process of the present invention is, in general, of the order of 45% by volume, which is considerably higher than that obtained in the processes employed hitherto. The process of the present invention is therefore particularly advantageous for use in conjunction with known processes for the production of sulphuric acid as it enables smaller units of such plants to be used for a desired output. The process has the additional advantage that when a granulated or moulded mixture of reactants is used the substantial absence of dust in the product gases simplifies the cleaning operations before such gases are passed to the sulphuric acid chambers or converters.

The residual solid material from the process may contain some calcium sulphide and unreacted calcium sulphate, but may be suitable for various uses, depending on the proportions of the components of the feed-material. For example when little or no clay is present, the residue may be used as an agricultural quality lime, or when the quantities of acidic oxides in the mixture of reactants are suitable, it may be burnt, if necessary, after the addition of lime or other materials, to produce cement clinker.

It will be understood that in general the tunnel kiln in which the mixture of reactants is heated by indirect means will be constructed of suitable refractory and other materials.

The process of the present invention is further illustrated by the following example in which gas compositions are by volume and gas volumes are measured at 20° C. and atmospheric pressure.

*Example*

A granular material of granule size $\frac{1}{16}$" to ⅛" was prepared from a mixture containing 72.7% ground natural anhydrite, 4.7% coke breeze and 22.6% clay, by dry weight; the molar ratios $CaSO_4:C:SiO_2+Al_2O_3$ being $1:0.6:0.53$. The analysis of the material was:

26.6% CaO  3.6% C
24% $SiO_2+Al_2O_3+Fe_2O_3$
38.9% $SO_3$  2.7% $CO_2$

This material was charged to a tunnel kiln at a rate of 710 kilograms per hour. Temperatures and heating periods of the mixture of reactants were as follows:

Heating up to 1000° C. for a period of 1 hour.
From 1000° C. to 1050° C. for a period of 0.5 hour.
From 1050° C. to 1100° C. for a period of 0.5 hour.
From 1100° C. to 1120° C. for a period of 0.6 hour.

Free sulphur was evolved at the rate of 13.4 kilograms per hour and was removed from the product gases by passing these through water.

The total product gas rate, after condensation of the free sulphur and the combined water from the clay used was 125 cubic metres per hour of the following composition:

41.3% $SO_2$, 55.7% $CO_2$, 2.4% $N_2$ and 0.6% $O_2$

The solid residue leaving the kiln averaged 445 kilograms per hour and gave on analysis:

43.7% CaO
42.6% $SiO_2+Al_2O_3+Fe_2O_3$
7.4% $SO_3$  0.71% Sulphide S

The total sulphur input was at the rate of 111 kilograms per hour and that remaining in the residue was about 16.3 kilograms per hour; that is the desulphurisation of the anhydrite was about 85%.

We claim:

1. A continuous process for the production of sulphur dioxide which comprises charging to the cars of a muffled continuous tunnel kiln at its inlet a mixture of solids containing calcium sulphate, carbonaceous material and silica, applying heat externally to the muffles of the kiln and progressing the cars continuously through the kiln so that the mixture charged thereon is indirectly heated within the kiln from the temperature at which it is charged to the cars to a temperature within the range of 900° C. to 1400° C., the said indirect heating taking place in the absence of added oxygen for sufficient time to insure substantial reaction of the components of the mixture, continuously withdrawing cars with reacted solid residue at the outlet of said tunnel kiln and recovering a gaseous mixture rich in sulphur dioxide from the space in the kiln above the cars.

2. A process as recited in claim 1 in which the carbonaceous material is present in the mixture in quantity to provide up to one mole of carbon per mole of calcium sulphate.

3. A continuous process for the production of sulphur dioxide which comprises charging to the cars of a muffled continuous tunnel kiln at its inlet a mixture of solids containing calcium sulphate, carbonaceous material and clay in such quantities as to give molar proportions of $CaSO_4:C:SiO_2+Al_2O_3$ of about $1:0.6:0.5$, applying heat externally to the muffles of the kiln and progressing the cars continuously through the kiln so that the mixture charged thereon is indirectly heated within the kiln from the temperature at which it is charged to the cars to a temperature within the range of 900° C. to 1400° C., the said indirect heating taking place in the absence of added oxygen for sufficient time to insure substantial reaction of the components of the mixture, continuously withdrawing cars with reacted solid residue at the outlet of said tunnel kiln and recovering a gaseous mixture rich in sulphur dioxide from the space in the kiln above the cars.

4. A process as recited in claim 3 in which the mixture is heated to a temperature within the range of 1000° C. to 1250° C.

5. A process as recited in claim 3 in which the mixture is charged to the muffled continuous tunnel kiln in the form of granules prepared by grinding and mixing the components and then granulating with the aid of a liquid bonding agent.

6. A process as claimed in claim 3 in which steam is admitted to the reaction space of the tunnel kiln.

References Cited in the file of this patent

UNITED STATES PATENTS

| Number | Name | Date |
|---|---|---|
| 1,198,817 | Bassett | Sept. 19, 1916 |
| 1,801,741 | Hasselbach | Apr. 21, 1931 |
| 2,141,228 | Singh | Dec. 27, 1938 |
| 2,222,740 | Boremann | Nov. 26, 1940 |
| 2,230,592 | Griessbach | Feb. 4, 1941 |
| 2,232,099 | Jahn | Feb. 18, 1941 |
| 2,250,186 | Noll | July 22, 1941 |
| 2,252,279 | Zirngibl | Aug. 12, 1941 |

FOREIGN PATENTS

| Number | Country | Date |
|---|---|---|
| 514,993 | Great Britain | Nov. 23, 1939 |